United States Patent
Ferenz et al.

(10) Patent No.: US 7,834,122 B2
(45) Date of Patent: *Nov. 16, 2010

(54) POLYSILOXANES WITH QUATERNARY AMMONIUM GROUPS, PREPARATION THEREOF AND USE THEREOF AS TEXTILE SOFTENERS

(75) Inventors: Michael Ferenz, Essen (DE); Sascha Herrwerth, Essen (DE); Tobias Maurer, Velbert (DE)

(73) Assignee: Goldschmidt GmbH (DE)

( * ) Notice: Subject to any disclaimer, the term of this patent is extended or adjusted under 35 U.S.C. 154(b) by 401 days.

This patent is subject to a terminal disclaimer.

(21) Appl. No.: 11/829,633

(22) Filed: Jul. 27, 2007

(65) Prior Publication Data

US 2008/0027202 A1    Jan. 31, 2008

(30) Foreign Application Priority Data

Jul. 31, 2006   (DE) .................... 10 2006 035 511

(51) Int. Cl.
*C08G 77/26*   (2006.01)

(52) U.S. Cl. .......................................... 528/38; 528/43

(58) Field of Classification Search ................ 528/38
See application file for complete search history.

(56) References Cited

U.S. PATENT DOCUMENTS

2006/0188455 A1*  8/2006  Ferenz et al. ............ 424/59

FOREIGN PATENT DOCUMENTS

| DE | 1 493 384 | 1/1969 |
|----|-----------|--------|
| DE | 33 40 708 | 5/1984 |
| EP | 0 282 720 | 9/1988 |
| EP | 1 439 200 | 7/2004 |

* cited by examiner

*Primary Examiner*—Randy Gulakowski
*Assistant Examiner*—Lindsay Nelson
(74) *Attorney, Agent, or Firm*—Frommer Lawrence & Haug LLP

(57) ABSTRACT

Polysiloxanes of formula (I)

$$[M'D_n]_3 T \qquad (I),$$

where
$M'=QSiY_2O_{1/2}$
$D=SiY_2O_{2/2}$
$T=SiZO_{3/2}$
are useful as softeners for wovens, nonwovens and/or fibers composed of natural and/or synthetic raw materials.

2 Claims, No Drawings

POLYSILOXANES WITH QUATERNARY AMMONIUM GROUPS, PREPARATION THEREOF AND USE THEREOF AS TEXTILE SOFTENERS

This invention concerns novel polysiloxanes having quaternary ammonium groups and also a process for preparing them. It further concerns the use of these polymers as softeners for wovens, nonwovens and/or fibers composed of natural and/or synthetic raw materials.

Polysiloxanes having quaternary groups and their application as textile softeners are known from the patent literature. For instance, DE-B-14 93 384 describes structures wherein siloxanes are laterally modified with ammonium groups.

EP 0 282 720 describes structures wherein the quaternary functions are terminally attached to the siloxane. Such compounds offer advantages with regard to their performance as textile softeners. They lead to a very pleasant fabric hand. This is attributable to the unmodified siloxane backbone.

The disadvantage of the structures described in EP 0 282 720 is that the degree of modification is at most two. A textile treated with such compounds does acquire good softness, but the siloxane is easily removed back off the treated textile, by washing operations for example, owing to the low substantivity of the siloxane on the textile. It would be desirable for the siloxane to remain on the textile after washing so that there is no loss of softness.

DE-A-33 40 708 discloses polyquaternary polysiloxane polymers. Polyquaternary polysiloxane polymers of this type do not have the above-described disadvantages. However, their costly and inconvenient method of preparation is an obstacle to commercial use of these compounds. They are only obtainable in yields of ≦60% of theory, which are not commercially acceptable.

Depending on the siloxane scaffold and its chain length, most commercially available siloxane quats are not self-emulsifiable in water and need additions of emulsifiers and/or solvents to convert them into an aqueous formulation.

The emulsifiers used are typically fatty alcohol ethoxylates having degrees of ethoxylation between 3 and 12 and they are used in a range from 4:1 to 2:1 for the ratio of softener to fatty alcohol ethoxylate. Useful solvents include for example high-boiling glycols such as dipropylene glycol or butyldiglycol. Typical commercial formulations contain 5 to 20% of siloxane quat, 2 to 15% of emulsifier and 0 to 10% of solvent.

Softener formulations based on polysiloxane polymers of the prior art all further share the feature that it takes just a single wash for a textile finished with them to very substantially lose its softness.

It is an object of the present invention to provide quaternary polysiloxane polymers that are obtainable in good yields and also have the desired performance profile, in particular a very good hydrophilic soft hand and also an enhanced durability on textiles. In addition, a high rebound elasticity and improved crease recovery on the part of a fabric thus finished are to be counted as a further positive property.

We have found that this object is achieved, surprisingly, by siloxanes of the general formula (I)

$$[M'D_n]_3 T \quad (I)$$

where:
$M'=QSiY_2O_{1/2}$
$D=SiY_2O_{2/2}$
$T=SiZO_{3/2}$
Q represents identical or different organic radicals bearing ammonium functions,
Y represents identical or different radicals from the group consisting of alkyl, aryl or alkaryl having 1 to 30 carbon atoms, preferably methyl or phenyl, in particular methyl,
Z represents identical or different radicals from the group consisting of alkyl, aryl or alkaryl having 1 to 30 carbon atoms, preferably methyl or phenyl, in particular phenyl,
T is on average present once per polymer chain. However, there is a mixture of molecules so that a certain fraction of the molecules will have no or a plurality of T-units,
n is 5 to 250, preferably 10 to 150, in particular 12 to 100.

Suitable Q radicals are for example groups having the construction —R1—R2 where
R1 preferably represents identical or different bivalent radicals selected from the group consisting of

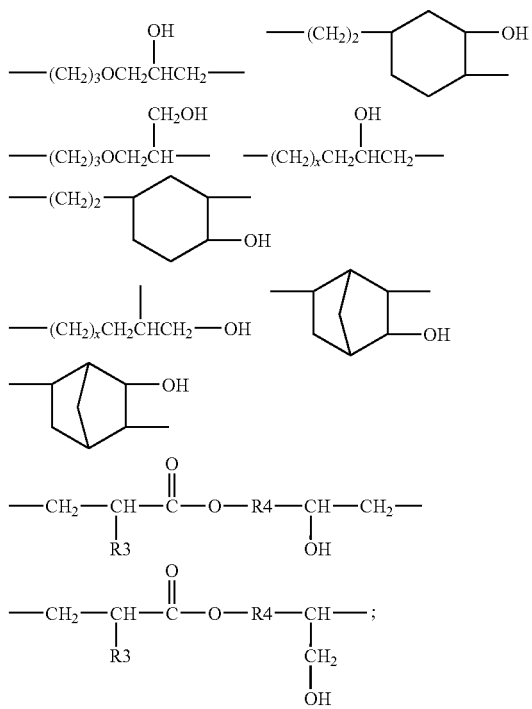

R1 is preferably

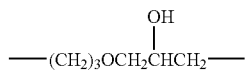

R2 is selected from the group consisting of

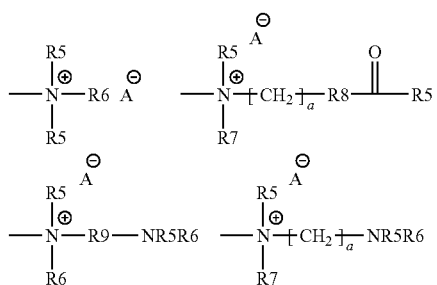

-continued

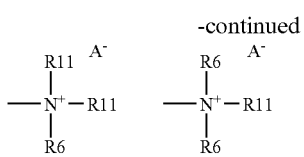

R3 represents identical or different radicals from the group consisting of hydrogen and alkyl having 1 to 6 carbon atoms, preferably methyl, R4 represents identical or different radicals, bivalent hydrocarbyl radicals, with or without ether functions, preferably methylene, R5, R6, R7 independently represent hydrogen or alkyl radicals having 1 to 30 carbon atoms, R8 represents identical or different radicals from the group consisting of —O— and —NR10, R9 represents identical or different (n+1)-bonding, branched or unbranched hydrocarbyl radicals, R10 represents identical or different radicals from the group consisting of hydrogen and alkyl having 1 to 6 carbon atoms, R11 represents identical or different radicals of the general formula

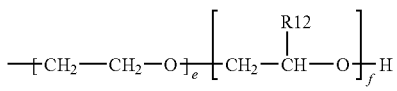

R12 represents identical or different alkyl, aryl or alkaryl radicals having 1 to 30 carbon atoms, with or without ether functions, preferably methyl, ethyl or phenyl, in particular methyl, e represents 0 to 20, preferably 0 to 10, in particular 1 to 3, f represents 0 to 20, preferably 0 to 10, $e+f \geq 1$ x represents 2 to 18, a represents 2 to 18, preferably 3, A represents identical or different counterions to the positive charges on the quaternized nitrogen groups, selected from well-known prior art organic or inorganic anions of physiologically acceptable acids HA, as particularly preferably from acetic acid, L-hydroxy carboxylic acid or aromatic carboxylic acids.

A person skilled in the art is familiar with the fact that the compounds are present in the form of a mixture having a distribution that is substantially governed by statistical laws.

This invention also provides a process for preparing the present invention's products by equilibration of phenyltris (dimethylsiloxy)silane with octamethylcyclo-tetrasiloxane and/or decamethylcyclopentasiloxane (cycles) in a conventional manner. Phenyltris(dimethylsiloxy)silane is a commercially available product. Suitable methods of equilibrating siloxanes are described for example in the patent specification EP 1 439 200.

The content of the patent literature cited above for equilibration is hereby incorporated herein by reference and shall be deemed part of the disclosure content of the present application.

As well as cyclic siloxanes, α, ω-di-SiH-functional siloxanes or nonfunctional siloxanes can also be added to the equilibrating mixture in order that the average degree of modification may be set in a controlled manner.

The SiH-functional siloxanes thus obtained are subsequently used to hydrosilylate epoxides comprising double bonds. A person skilled in the art will know the platinum, rhodium or ruthenium catalysts used for hydrosilylation. Useful epoxides include:

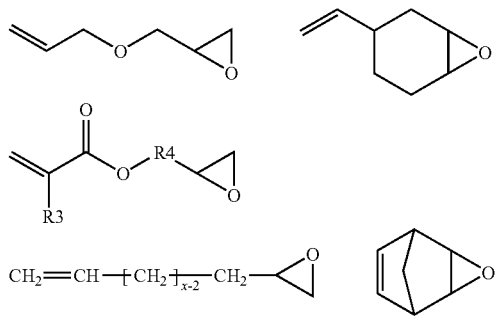

The epoxysiloxanes thus obtained are lastly reacted with tertiary amines to give the desired siloxanes bearing quaternary ammonium functions.

A person skilled in the art will know that such a reaction sequence is unlikely to proceed without secondary reactions occurring not only in the equilibration of the SiH-functional siloxanes but also in the hydrosilylation and quaternization. The extent to which secondary reactions occur depends inter alia on the identity of the reactants, but also on the reaction conditions.

The products according to the present invention are technical-grade products. Therefore it is likely, in particular because of the secondary reactions, that, on average, the siloxanes bear fewer than three quaternary functions and accordingly the average degree of modification is less than three.

A person skilled in the art will know that this is not the only synthetic pathway leading to products which are in accordance with the present invention. More particularly, other reactants than phenyltris(dimethylsiloxy)silane can be used to introduce branching, an example being methyltris(dimethylsiloxy)silane.

The present invention further provides for the use of the present invention's compounds as hydrophilic durable softeners for wovens, nonwovens and/or fibers composed of natural and/or synthetic raw materials.

Compounds preferred for use as softeners for fibers have the formula (I) where n=10 to 150. Such compounds not only have a sufficiently high silicone character to create a pleasant hand but also have a viscosity that allows them to be formulated to form aqueous formulations.

The content in the aqueous formulations of the general formula (I) compound which is used according to the present invention is between 0.5% and 99% by weight, preferably between 3% and 70% by weight and particularly between 5% and 50% by weight, based on the entire formulation.

The examples which follow illustrate the invention. They shall not constitute any limitation whatsoever.

PREPARATION EXAMPLES

Example 1 a) Equilibration of an SiH-Functional Polysiloxane

In a 500 ml three-neck flask, 8.2 g of phenyltris(dimethylsiloxy)silane, 334 g of decamethylpentasiloxane and 0.34 g of an acidic catalyst were mixed and stirred at 80° C. for 4 hours. After cooling, 20 g of NaHCO$_3$ were added and stirring was continued at room temperature for 12 hours. After filtration, a clear product having an SiH of 0.02% was obtained.

b) Preparation of an Epoxysiloxane

In a 500 ml three-neck flask, 300 g of the compound prepared under 1 a) and 7.5 g of allyl glycidyl ether were together introduced as initial charge and heated to 100° C. Thereafter, 15 ppm of a platinum catalyst were added before stirring for 2 hours. An ensuing reaction gave a clear product having an epoxy value of 0.37%.

c) Conversion to quaternary polysiloxane polymer

In a 500 ml three-neck flask, 14.5 g of 3-N,N-dimethylaminopropyllauramide, 2.7 g of acetic acid and 120 g of isopropanol were stirred at room temperature. Thereafter, 200 g of the compound prepared according to 1 b) were added dropwise. Thereafter, the mixture was stirred for 8 hours at 50° C. and distilled to give a cloudy high-viscosity liquid which is described by the following statistical formula:

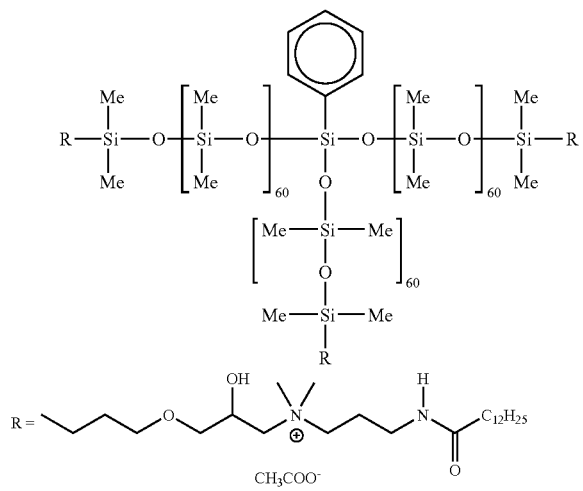

A person skilled in the art will appreciate that the formula indicated above represents an idealized structural formula. The product additionally includes linear and more highly branched structures.

Example 2 a) Equilibration of an SiH-Functional Polysiloxane

In a 1000 ml three-neck flask, 50 g of phenyltris(dimethylsiloxy)silane, 667 g of decamethylpentasiloxane and 0.7 g of an acidic catalyst were mixed and stirred at 80° C. for 4 hours. After cooling, 15 g of NaHCO$_3$ were added and stirring was continued at room temperature for 12 hours. After filtration, a clear product having an SiH of 0.07% was obtained.

b) Preparation of an Epoxysiloxane

In a 1000 ml three-neck flask, 670 g of the compound prepared under 1 a) and 65 g of allyl glycidyl ether were together introduced as initial charge and heated to 100° C. Thereafter, 15 ppm of a platinum catalyst were added before stirring for 2 hours. An ensuing reaction gave a clear product having an epoxy value of 0.99%.

c) Conversion to Silicone Quat

In a 1000 ml three-neck flask, 63 g of N,N-dimethylstearylamine, 12 g of acetic acid and 200 g of isopropanol were stirred at room temperature. Thereafter, 325 g of the compound prepared according to 1 b) were added dropwise. Thereafter, the mixture was stirred for 8 hours at 60° C. and distilled to give a cloudy high-viscosity liquid which is described by the following statistical formula.

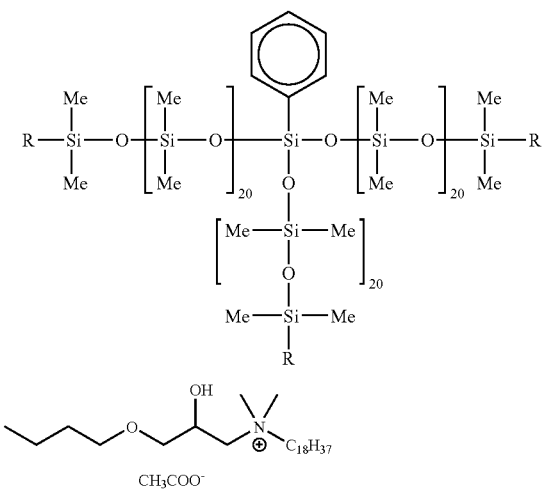

A person skilled in the art will appreciate that the formula indicated above represents an idealized structural formula. The product additionally includes linear and more highly branched structures.

Example 3 a) Equilibration of an SiH-Functional Polysiloxane

In a 500 ml three-neck flask, 33.1 g of phenyltris(dimethylsiloxy)silane, 274.4 g of decamethylpentasiloxane and 0.3 g of an acidic catalyst were mixed and stirred at 80° C. for 4 hours. After cooling, 10 g of NaHCO$_3$ were added and stirring was continued at room temperature for 12 hours. After filtration, a clear product having an SiH of 0.097% was obtained.

b) Preparation of an Epoxysiloxane

In a 250 ml three-neck flask, 103.5 g of the compound prepared under 3 a) and 15 g of allyl glycidyl ether were together introduced as initial charge and heated to 100° C. Thereafter, 15 ppm of a platinum catalyst were added before stirring for two hours. An ensuing reaction gave a clear product having an epoxy value of 1.4%.

c) Conversion to Silicone Quat

In a 500 ml three-neck flask, 32 g of 3-N,N-dimethylaminopropyllauramide, 6.2 g of acetic acid and 100 g of isopropanol were stirred at room temperature. Thereafter, 115 g of the compound prepared according to 3 b) were added dropwise. Thereafter, the mixture was stirred for 8 hours at 60° C. and distilled to give a cloudy high-viscosity liquid which is described by the following statistical formula.

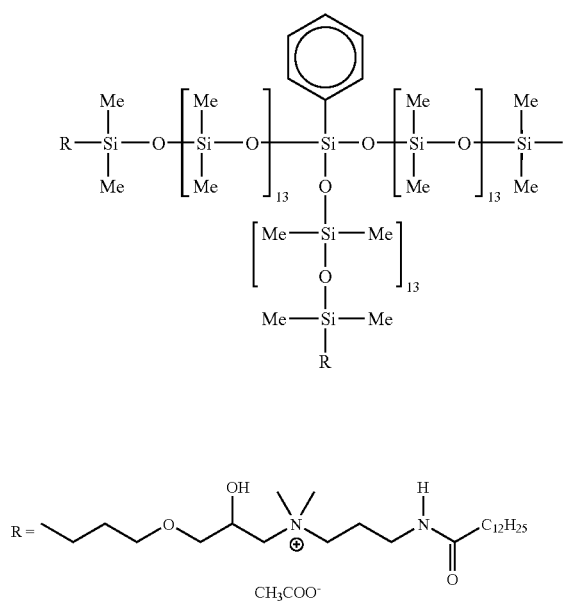

A person skilled in the art will appreciate that the formula indicated above represents an idealized structural formula. The product additionally includes linear and more highly branched structures.

Example 4 a) Equilibration of an SiH-Functional Polysiloxane

In a 500 ml three-neck flask, 3.3 g of phenyltris(dimethylsiloxy)silane, 220.4 g of decamethylpentasiloxane and 0.3 g of an acidic catalyst were mixed and stirred at 80° C. for 4 hours. After cooling, 4.5 g of NaHCO$_3$ were added and stirring was continued at room temperature for 12 hours. After filtration, a clear product having an SiH of 0.013% was obtained.

b) Preparation of an Epoxysiloxane

In a 1000 ml three-neck flask, 752 g of the compound prepared under 4 a) and 14.8 g of allyl glycidyl ether were together introduced as initial charge and heated to 100° C. Thereafter, 15 ppm of a platinum catalyst were added before stirring for two hours. An ensuing reaction gave a clear product having an epoxy value of 0.21%.

c) Conversion to Silicone Quat

In a 250 ml three-neck flask, 3.2 g of 3-N,N-dimethylaminopropyllauramide, 0.62 g of acetic acid and 50 g of isopropanol were stirred at room temperature. Thereafter, 76.2 g of the compound prepared according to 4 b) were added dropwise. Thereafter, the mixture was stirred for 8 hours at 60° C. and distilled to give a cloudy high-viscosity liquid which is described by the following statistical formula.

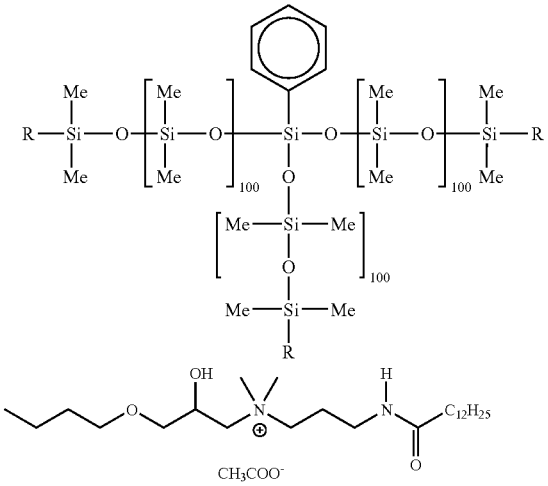

A person skilled in the art will appreciate that the formula indicated above represents an idealized structural formula. The product additionally includes linear and more highly branched structures.

USE EXAMPLES

Formulation Examples

General Formulation

5% to 50% by weight of the present invention's siloxane quat is introduced with stirring as initial charge into a glass beaker equipped with propeller stirrer. Thereafter, 5% to 25% by weight of dipropylene glycol, 3% to 10% by weight of a fatty alcohol ethoxylate having a degree of ethoxylation of 6 and 3% to 10% by weight of a fatty alcohol ethoxylate having a degree of ethoxylation of 12 were added in succession with stirring. Lastly, the mixture was made up to 100% by weight with water.

Formulation 1—Inventive 20 parts of the inventive siloxane quat of example 1 are introduced with stirring as initial charge into a glass beaker equipped with propeller stirrer. Thereafter, 21 parts of dipropylene glycol, 10 parts of a fatty alcohol ethoxylate having a degree of ethoxylation of 6 and 10 parts of a fatty alcohol ethoxylate having a degree of ethoxylation of 12 are added in succession with stirring. Lastly, the mixture is made up to the mark with 39 parts of water. A clear to opaque low-viscosity formulation is obtained.

Formulations 2, 3 and 4 were prepared from the inventive examples 2, 3 and 4 similarly to the preparation of the general formulation.

Formulation 5—Not Inventive

A commercially available microemulsion of an amino-functionalized siloxane, for example TEGOSVIN® IE 11/59 having a solids content of 20% by weight.

Formulation 6—Not Inventive

A commercially available emulsion of an organic softener, for example REWOQUAT® WE 18 having a solids content of 15% by weight.

Application Examples

To verify the hand and also the hydrophilicity of the present invention, products consisting of natural fibers were finished using the following process:

Padding Process

To examine the softness conferred by each emulsion, knit cotton fabric (160 g/m$^2$) and terry cotton fabric→Tab 1 (400 g/m$^2$) were padded with a liquor containing in each case 20 g/l of the corresponding emulsion, squeezed off to a wet pick-up of about 100% and dried at 130° C. for three minutes.

To examine the hydrophilicity, woven cotton fabrics (200 g/m$^2$) were padded with liquor containing in each case 50 g/l of the corresponding emulsion and squeezed off to a wet pick-up of about 100% and dried at 130° C. for three minutes.

Test Methods

Hand Assessment

Fabric hand was assessed by an experienced team which assessed the anonymized hand samples, the knit and terry fabrics finished with the emulsions, with the aid of a hand panel test. The hand samples of knit fabric additionally included an untreated sample not overtly labeled.

Hydrophilicity Testing

Hydrophilicity testing was performed using an in-house test method for measuring the height of rise of water, in line with German standard specification DIN 53924. The finished woven cotton test fabric was cut into five strips each 25 cm in length and 1.5 cm in width, which were marked with a water-soluble pin and secured in the taut perpendicular position, but without tension, to a holder. The holder is subsequently placed for five minutes in a water bath such that 2 cm of the strips are in the water. After the holder has stood outside the water bath for 10 minutes, the height of rise is read off in cm and assessed against the blank value (rise of height of untreated cotton strip×cm=100%) and reported as a % age of the blank value.

Washing Operation

The washing operations were performed in a commercial washing machine, Miele Novotronic W 918, with coloreds wash without prewash at 40° C. using wfk standard laundry detergent IECA base and 3 kg of cotton ballast fabric. The fabric thus treated was finally dried at room temperature for 12 hours.

The test results for softness are reported in tables 1 and 2 and for hydrophilicity in table 3.

TABLE 1

Softness assessment on knit cotton after application by padding

|  | before washing | after 1st wash | after 3rd wash | after 5th wash |
|---|---|---|---|---|
| Formulation 1 inventive | +++ | +++ | ++ | ++ |
| Formulation 2 inventive | ++ | + | ○ | ○ |
| Formulation 3 inventive | ++ | + | − | − |
| Formulation 4 inventive | +++ | +++ | +++ | ++ |
| Formulation 5 not inventive | +++ | ++ | ++ | ++ |
| Formulation 6 not inventive | ++ | ○ | − | − |
| Untreated | − | − | − | − |

+++ excellent,
++ very good,
+ good,
○ satisfactory,
− poor

TABLE 2

Softness assessment on terry cotton after application by padding

|  | before washing | after the 1st wash | after the 3rd wash | after the 5th wash |
|---|---|---|---|---|
| Formulation 1 inventive | +++ | +++ | +++ | ++ |
| Formulation 2 inventive | ++ | + | ○ | ○ |
| Formulation 3 inventive | ++ | + | − | − |
| Formulation 4 inventive | +++ | +++ | +++ | ++ |
| Formulation 5 not inventive | +++ | ++ | ++ | ++ |
| Formulation 6 not inventive | ++ | ○ | − | − |
| Untreated | − | − | − | − |

+++ excellent,
++ very good,
+ good,
○ satisfactory,
− poor

TABLE 3

Rewet behavior on woven cotton

|  | before washing | after the 1st wash | after the 3rd wash | after the 5th wash |
|---|---|---|---|---|
| Formulation 1 inventive | 83 | 84 | 84 | 87 |
| Formulation 2 inventive | 85 | 85 | 90 | 90 |
| Formulation 3 inventive | 86 | 88 | 91 | 93 |
| Formulation 4 inventive | 80 | 80 | 79 | 81 |
| Formulation 5 not inventive | 80 | 70 | 55 | 50 |
| Formulation 6 not inventive | 80 | 95 | 98 | 98 |
| Untreated | 100 | 100 | 100 | 100 |

Elucidation

The result is a soft, very fluffy and silky hand for the fabric finished with the inventive product (formulation 1 for example). In addition, the fabric thus finished exhibited a high rebound elasticity and an improved crease recovery.

The pleasant hand substantially survived repeated washing. It can be seen in addition that hydrophilicity is also preserved throughout repeated washing.

The cotton fabric impregnated with formulation 5 on the basis of an aminosiloxane combines a showing of likewise durable hand assessment (tables 1 and 2) with a typical decrease in hydrophilicity (table 3).

In contrast, softness distinctly decreases after just a single wash for the nondurable product of Example 6 (tables 1 and 2). The removal of the softener during the washing operation correspondingly results in an increased hydrophilicity (table 3).

What is claimed is:

1. A process for preparing a polysiloxane of the general formula $$[M'D_n]_3 T \quad (I),$$

where
- $M' = QSiY_2O_{1/2}$
- $D = SiY_2O_{2/2}$
- $T = SiZO_{3/2}$
- Q = identical or different organic radicals bearing ammonium functions,
- Y = identical or different radicals from the group consisting of alkyl, aryl or alkaryl having 1 to 30 carbon atoms, preferably methyl or phenyl, in particular methyl,
- Z = identical or different radicals from the group consisting of alkyl, aryl or alkaryl having 1 to 30 carbon atoms, preferably methyl or phenyl, in particular phenyl,
- n = 5 to 250, which comprises applying conventional conditions to equilibrate phenyltris(dimethylsiloxy)silane with cyclic siloxanes in a first stage and subsequently to hydrosilylate these in a second stage with epoxides comprising double bonds and to react the epoxysilanes thus obtained with tertiary amines in a third stage to give the corresponding ammonio-bearing siloxanes.

2. A formulation comprising 5% to 50% by weight of the polysiloxanes prepared according to claim 1.

* * * * *